United States Patent
Wada et al.

(10) Patent No.: US 7,173,884 B2
(45) Date of Patent: Feb. 6, 2007

(54) MAGNETOOPTIC RECORDING MEDIUM AND ITS MANUFACTURING METHOD

(75) Inventors: Yutaka Wada, Miyagi (JP); Hiroshi Nakayama, Miyagi (JP)

(73) Assignee: Sony Corporation, Tokyo (JP)

( * ) Notice: Subject to any disclaimer, the term of this patent is extended or adjusted under 35 U.S.C. 154(b) by 584 days.

(21) Appl. No.: 10/482,424

(22) PCT Filed: May 14, 2002

(86) PCT No.: PCT/JP02/04638

§ 371 (c)(1),
(2), (4) Date: Dec. 29, 2003

(87) PCT Pub. No.: WO03/003363

PCT Pub. Date: Jan. 9, 2003

(65) Prior Publication Data

US 2004/0180238 A1 Sep. 16, 2004

(30) Foreign Application Priority Data

Jun. 29, 2001 (JP) .............................. 2001-199741

(51) Int. Cl.
*G11B 11/00* (2006.01)
*B32B 3/02* (2006.01)

(52) U.S. Cl. .............................. 369/13.42; 369/13.07; 369/13.43; 369/288; 428/694 ML; 428/694 SC; 428/64.4

(58) Field of Classification Search .............. 369/13.07, 369/13.42, 13.44, 13.47, 13.46, 13.15, 13.43, 369/13.48, 13.49, 283, 288, 13.4, 13.41; 428/694 ML, 694 SC, 64.4
See application file for complete search history.

(56) References Cited

U.S. PATENT DOCUMENTS

| 5,768,218 | A | * | 6/1998 | Nakayama et al. | ........ | 369/13.4 |
| 5,790,513 | A | * | 8/1998 | Hiroki et al. | ............ | 369/275.2 |
| 5,862,105 | A | * | 1/1999 | Nishimura | ................ | 369/13.42 |
| 5,879,822 | A | * | 3/1999 | Okada | ........................ | 428/819.2 |
| 6,187,460 | B1 | * | 2/2001 | Nishimura | ................ | 428/820.3 |
| 6,707,766 | B2 | * | 3/2004 | Mori et al. | ............... | 369/13.08 |

(Continued)

FOREIGN PATENT DOCUMENTS

JP 05-182269 7/1993

(Continued)

*Primary Examiner*—Ali Neyzari
(74) *Attorney, Agent, or Firm*—Sonnenschein Nath & Rosenthal LLP

(57) ABSTRACT

A first dielectric layer 3, a multilayer magnetic film 10 in which a first magnetic layer 4 having perpendicular magnetic anisotropy at room temperature, a second magnetic layer 5 having inplane magnetic anisotropy at room temperature, and a third magnetic layer 6 having perpendicular magnetic anisotropy at room temperature are sequentially laminated, a second dielectric layer 7, a reflective layer 8, and a protective layer 9 are sequentially laminated onto one principal plane of a disk substrate 2 on which a land and a groove exist, thereby forming a magnetooptic disk 1. Saturation magnetization of the second magnetic layer 5 is set to a range from $8.80 \times 10^{-2}$ to $1.76 \times 10^{-1}$ Wb/m². A gas pressure upon film creation of the second magnetic layer is set to a range from 0.6 to 3.0 Pa. A content ratio of Co in the third magnetic layer 6 is set to a range from 15 to 17 atom %.

18 Claims, 14 Drawing Sheets

U.S. PATENT DOCUMENTS 6,844,083 B2 * 1/2005 Sugimoto et al. ........... 428/611

FOREIGN PATENT DOCUMENTS

| JP | 07-244877 | 9/1995 |
| JP | 08-102101 | 4/1996 |
| JP | 09-147436 | 6/1997 |
| JP | 10-293949 | 11/1998 |
| JP | 2000-200448 | 7/2000 |
| JP | 2001-331985 | 11/2001 |
| JP | 2001-338448 | 12/2001 |

* cited by examiner

Fig. 11 GROOVE

LAND

MAGNETOOPTIC RECORDING MEDIUM AND ITS MANUFACTURING METHOD

BACKGROUND OF THE INVENTION

The invention relates to a magnetooptic recording medium and its manufacturing method and, more particularly, to a magnetooptic recording medium and its manufacturing method which are suitable to be applied to a magnetooptic disk, a magnetooptic tape, and a magnetooptic card in which Magnetically Induced Super Resolution reproduction can be performed.

Hitherto, in association with the realization of a high density of recording marks in a magnetooptic disk, a further increase in recording capacity is progressing. To increase the recording capacity as mentioned above, a method of realizing the high density by reducing a length of recording mark, narrowing a track pitch, and microminiaturizing a recording pit is used.

As means which is effective in realizing the high density, a Magnetically Induced Super Resolution technique (MSR) by which the recording mark smaller than a spot diameter of a laser beam can be reproduced has been proposed (for example, JP-A-2000-200448). According to the MSR, in the case where a main magnetic laminate film comprises a first magnetic layer, a second magnetic layer, and a third magnetic layer, by allowing the second magnetic layer to have inplane magnetization at room temperature in the spot of the laser beam, the magnetization in a low temperature portion is directed to an initialization magnetic field direction, thereby shutting off transfer of an information signal recorded in the third magnetic layer. In a middle temperature portion, since perpendicular magnetization is performed, the transfer of the signal is assisted by a switched connection force of the magnetic layers. Further, in a high temperature portion, by extinguishing the magnetization at a Curie temperature $T_c$, the transfer to the first magnetic layer is shut off, thereby enabling the signal smaller than the spot diameter of the laser beam to be reproduced.

Specifically speaking, as shown in FIG. 1, in a magnetooptic disk 100, assuming that the first magnetic layer is a reproducing layer 101, the second magnetic layer is an intermediate layer 102, and the third magnetic layer is a recording layer 103, when the magnetooptic disk 100 is rotated and the laser beam for reproduction is irradiated onto the magnetic laminate film, temperature distribution is caused in the magnetooptic disk 100. An arrow in FIG. 1 indicates a magnetizing state of the magnetooptic disk 100 upon reproduction.

In a state where the temperature distribution has been caused, in a low temperature area, when a reproducing magnetic field is larger than the switched connection force which acts on a portion between the intermediate layer 102 and the recording layer 103, the magnetizing direction of the intermediate layer 102 is aligned to the same direction as that of a reproducing magnetic field. The magnetizing direction of the reproducing layer 101 which has been switched-connected to the intermediate layer 102 is aligned to the direction opposite to that of the reproducing magnetic field irrespective of the recording mark. Thus, a front mask is formed. In a high temperature area, the switched connection force which acts on a portion between the reproducing layer 101 and the intermediate layer 102 is shut off and the magnetizing direction of the reproducing layer 101 is aligned to the same direction as that of the reproducing magnetic field, so that a rear mask is formed. In a middle temperature area, the switched connection force larger than the reproducing magnetic field acts on the portions between each of the reproducing layer 101, the intermediate layer 102, and the recording layer 103, so that the magnetizing direction of the recording layer 103 is transferred to the reproducing layer 101.

As mentioned above, when a magnetooptic output of the magnetooptic disk 100 is detected, the mask is formed in the low temperature area and the high temperature area in the spot of the laser beam. Therefore, a magnetooptic signal can be reproduced only from the middle temperature area without reproducing a magnetic signal of the area where the mask has been formed.

However, to realize microminiaturization of the recording mark as mentioned above, a sudden decrease in amplitude of the signal to be read out becomes a problem. Therefore, in the magnetooptic disk, to realize the even higher density in the future, improvement in magnetic resolution in the signal detection is necessary.

There is a variation in intensity of the laser beam which is irradiated from an optical pickup. Further, since the Magnetically Induced Super Resolution operation (MSR operation) is very sensitive to the intensity of the laser beam, not only the improvement in the magnetic resolution but also suppression of narrowing of a margin against a recording power are necessary.

Therefore, there has been strongly demanded a development of a technique of a magnetooptic recording medium such that even if the recording mark is microminiaturized and the track pitch is narrowed, the margin against the recording power is not narrowed but the magnetic resolution is improved and optical characteristics upon reproduction are satisfied.

It is, therefore, an object of the invention to provide a magnetooptic recording medium and its manufacturing method having high reliability such that a power margin of a laser beam can be assured in a wide range where recording and/or reproduction can be performed, so that an information signal recorded on the magnetooptic recording medium on which a recording mark length is microminiaturized and a track pitch is narrowed is reproduced while keeping good signal characteristics, high recording density can be realized, and a large capacity can be realized.

SUMMARY OF THE INVENTION

To accomplish the above object, according to the first invention of the invention, there is provided a magnetooptic recording medium in which a multilayer magnetic film in which a first magnetic layer having perpendicular. magnetic anisotropy at room temperature, a second magnetic layer having inplane magnetic anisotropy at room temperature, and a third magnetic layer having perpendicular magnetic anisotropy at room temperature are sequentially laminated is provided on a substrate and by irradiating a laser beam onto the multilayer magnetic film, an information signal can be recorded and/or reproduced, wherein saturation magnetization of the second magnetic layer is larger than $8.80 \times 10^{-2}$ Wb/m$^2$ and is less than $1.76 \times 10^{-1}$ Wb/m$^2$.

In the first invention, a film thickness of the second magnetic layer is typically equal to or larger than 25 nm and is equal to or less than 60 nm, preferably, is equal to or larger than 28 nm and is equal to or less than 35 nm.

In the first invention, saturation magnetization of the first magnetic layer is typically equal to or less than $8.80 \times 10^{-2}$ Wb/m$^2$ and, preferably, is equal to or larger than $1.00 \times 10^{-2}$ Wb/m$^2$.

In the first invention, typically, the multilayer magnetic film is provided on one principal plane on the substrate on which concave and convex groove tracks are formed and the substrate has a plane ring shape.

In the second invention of the invention, there is provided a manufacturing method of a magnetooptic recording medium in which a multilayer magnetic film in which a first magnetic layer having perpendicular magnetic anisotropy at room temperature, a second magnetic layer having inplane magnetic anisotropy at room temperature, and a third magnetic layer having perpendicular magnetic anisotropy at room temperature are sequentially laminated is provided on one principal plane of a substrate and by irradiating a laser beam onto the multilayer magnetic film, an information signal can be recorded and/or reproduced, wherein a pressure of a gas at the time of forming the second magnetic layer is larger than 0.6 Pa and is equal to or less than 3.0 Pa.

In the second invention, typically, the first magnetic layer is formed so that saturation magnetization of the first magnetic layer is equal to or less than $8.80 \times 10^{-2}$ Wb/m$^2$ and, more preferably, is equal to or larger than $1.00 \times 10^{-2}$ Wb/m$^2$.

In the second invention, typically, the second magnetic layer is formed as a film so that saturation magnetization of the second magnetic layer is larger than $8.80 \times 10^{-2}$ Wb/m$^2$ and is less than $1.76 \times 10^{-1}$ Wb/m$^2$.

In the invention, typically, a content ratio of Co in the third magnetic layer is equal to or larger than 15 atom % and is equal to or less than 17 atom %.

In the invention, typically, the multilayer magnetic film is provided on one principal plane on the substrate on which concave and convex groove tracks are formed and the substrate has a plane ring shape. Further, a track pitch of the groove tracks on one principal plane of the substrate is equal to or larger than $0.47 \cdot \lambda/NA\mu m$ and is equal to or less than $0.83 \cdot \lambda/NA\mu m$.

In the invention, typically, the Curie temperature in the second magnetic layer is smaller than a smaller one of the Curie temperatures of the first and third magnetic layers. In the invention, typically, the second magnetic layer is formed so that a film thickness is equal to or larger than 30 nm and is equal to or less than 60 nm.

Typically, the invention is applied to a magnetooptic recording medium using what is called a land groove recording system in which the information signal is recorded onto both of the land and the groove on one principal plane of the substrate on which concave and convex groove tracks are formed. However, the invention can be also applied to a magnetooptic recording medium using what is called a land recording system in which the information signal is recorded onto the land portion or what is called a groove recording system in which the information signal is recorded onto the groove.

Typically, the invention is applied to a reproducing method called RAD (Rear Aperture Detection) in which the signal is detected in a rear high temperature portion in the reproducing light spot. Specifically speaking, the invention is applied to a magnetooptic recording medium using a double mask type RAD system in which masks are formed in forward and backward portions in the progressing direction of the spot called D-RAD. According to the RAD system, since a high temperature area having a width smaller than a width of spot in the spot becomes a detection area of the recording mark, as compared with a FAD system in which a low temperature area C of the spot is used as a detection area, a width in the track direction of the detection area is narrower, a crosstalk from the adjacent track is smaller, and a ratio at which the invention contributes to the realization of a high recording density is larger.

According to the invention constructed as mentioned above, in the magnetooptic recording medium provided with the multilayer magnetic film having the second magnetic layer having inplane magnetic anisotropy at room temperature, a pressure of the second magnetic layer upon film creation is higher than 0.6 Pa and is equal to or lower than 3.0 Pa and saturation magnetization of the second magnetic layer at room temperature is larger than $8.80 \times 10^{-2}$ Wb/m$^2$ and is less than $1.76 \times 10^{-1}$ Wb/m$^2$. Thus, jitter characteristics can be improved while a recording power margin and a reproducing power margin of the laser beam are assured in a sufficiently wide range.

DETAILED DESCRIPTION OF THE PRESENTLY PREFERRED EMBODIMENTS

Figure 1:
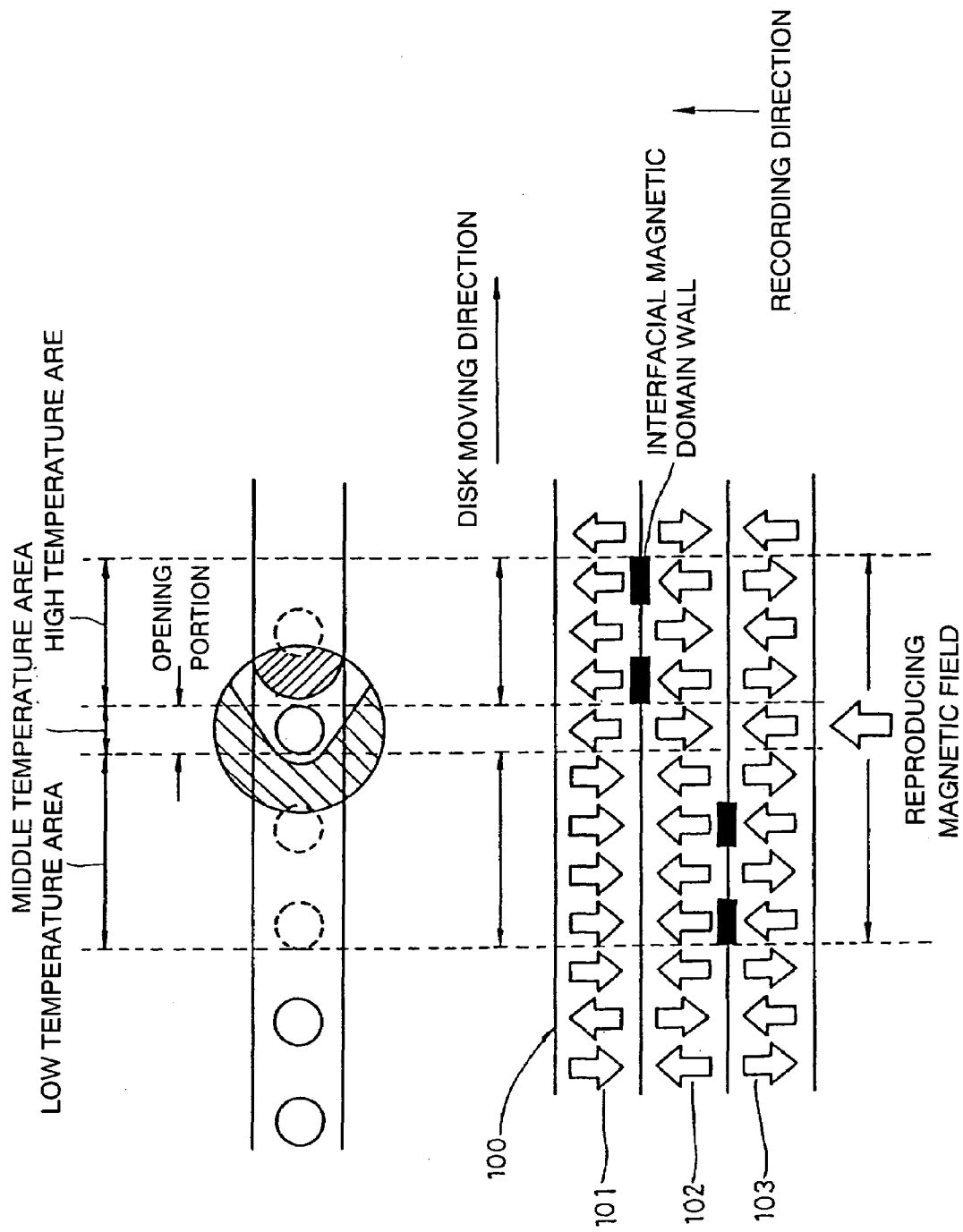
FIG. 1 is a schematic diagram for explaining the Magnetically Induced Super Resolution operation according to the prior art.

An embodiment of the invention will be described hereinbelow with reference to the drawings. In all of the following diagrams of the embodiment, the same or corresponding portions are designated by the same reference numerals.

Figure 2:
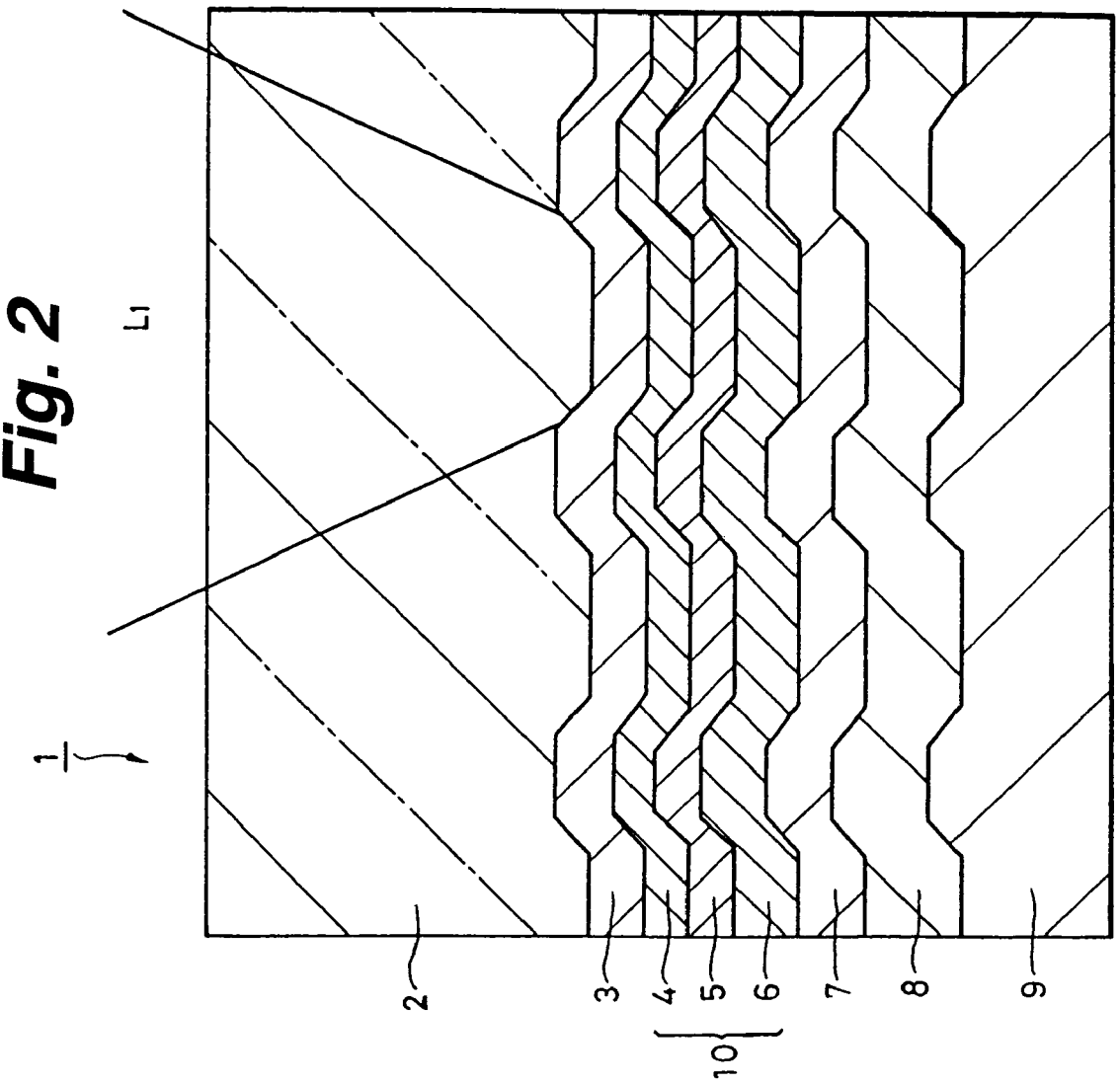
FIG. 2 is a cross sectional view showing a magnetooptic disk according to an embodiment of the invention.

First, a magnetooptic disk according to the embodiment of the invention will be described. FIG. 2 shows the magnetooptic disk according to the first embodiment.

As shown in FIG. 2, a magnetooptic disk 1 according to the embodiment is constructed by sequentially laminating a first dielectric layer 3, a first magnetic layer 4, a second magnetic layer 5, a third magnetic layer 6, a second dielectric layer 7, a reflective layer 8, and a protective layer 9 onto one principal plane of a disk substrate 2.

The disk substrate 2 is made by molding a resin material into a disk shape by, for example, an injection molding method. For example, glass 2P or the like or a synthetic resin material such as polycarbonate (PC) or the like is used as a resin material. In the embodiment, for example, a PC substrate made of PC is used. A concave and convex groove track comprising the land and groove is formed on one principal plane of the disk substrate 2. An example of dimensions of the disk substrate 2 is mentioned here. It is now assumed that a thickness t is equal to 1.2 mm, a diameter φ is equal to 86 mm (3.5 inches), a track pitch Tp is equal to 0.67 μm, and a depth of groove is equal to 50 nm. As a disk substrate 2, any substrate can be used so long as it is made of a material which can at least transmit a laser beam that is used when an information signal is recorded and/or reproduced onto/from the magnetooptic disk 1. The values of the thickness t, diameter φ, track pitch Tp, and groove depth can be also set to values other than the above-mentioned values. A protective layer such as an ultraviolet curing resin or the like can be also formed on the surface on the side of the disk substrate 2 where the laser beam is irradiated.

The first dielectric layer 3 formed on one principal plane of the disk substrate 2 is made of for example, silicon nitride ($Si_3N_4$) having a film thickness of 80 nm. The first dielectric layer 3 is provided to protect the first magnetic layer 4, second magnetic layer 5, and third magnetic layer 6 from moisture or the like and to optically enhance a magnetooptic effect in the first magnetic layer 4.

The first magnetic layer 4 formed on the first dielectric layer 3 is a rare earth alloy (GdFeCo) film having a film thickness of, for example, about 40 nm and made of Gd as a rare earth metal and Fe and Co as transition metal. The first magnetic layer 4 is transition metal magnetic dominant (hereinafter, referred to as TM rich) and has an axis of easy magnetization in the perpendicular direction, that is, in the laminating direction. According to the knowledge obtained by experiments by the inventors et al., it is necessary that saturation magnetization $Ms_1$ at room temperature (10° C. to 35° C.) of the first magnetic layer 4 is equal to or less than $8.8 \times 10^{-2}$ Wb/m² in order to suppress deterioration in reproduction signal. Therefore, the saturation magnetization $Ms_1$ is selected from values which are equal to or less than $8.8 \times 10^{-2}$ Wb/m² (70 emu/cc). In the embodiment, a value of about $3.8 \times 10^{-2}$ Wb/m² (30 emu/cc) is selected. As necessary, it is also possible to set it to a value which is equal to or larger than $1.0 \times 10^{-2}$ Wb/m² (8 emu/cc). The saturation magnetization $Ms_1$ increases together with a temperature rise up to about 170° C. A Curie temperature $Tc_1$ is almost equal to about 300° C. A coercive force $Hc_1$ at room temperature is equal to or less than, for example, $1.19 \times 10^5$ A/m.

The second magnetic layer 5 provided on the first magnetic layer 4 is made of, for example, a GdFeCoSi film. Si as a non-magnetic element is an element for setting a Curie temperature $Tc_2$ to be low and an element such as Al, Cr, or the like can be also added in place of Si. The Curie temperature $Tc_2$ in the second magnetic layer 5 is equal to about 200° C. The second magnetic layer 5 is rare earth magnetic dominant (hereinafter, referred to as RE rich) in which a compensation temperature is not seen up to the Curie temperature $Tc_2$ and has an axis of easy magnetization in the inplane direction at room temperature (10° C. to 35° C.). When the temperature rises to a value which is equal to or higher than a predetermined temperature higher than the room temperature, the axis of easy magnetization changes from the inplane direction to the perpendicular direction.

Since a thickness of magnetic domain wall is equal to about 25 nm, specifically speaking, it is necessary to set the film thickness of the second magnetic layer 5 to 25 nm or more, preferably, 28 nm or more. According to the knowledge of the inventors et al., if the film thickness of the second magnetic layer 5 is too large, the sensitivity deteriorates or the jitter rises, so that quality of a reproduction signal deteriorates. Therefore, typically, the film thickness of the second magnetic layer 5 is selected from a range of 25 to 60 nm, preferably, from a range of 28 to 35 nm. In the embodiment, it is selected to, for example, 32 nm.

To execute the Magnetically Induced Super Resolution (MSR) operation, it is necessary that saturation magnetization $Ms_2$ at room temperature (10° C. to 35° C.) of the second magnetic layer 5 is equal to or larger than the saturation magnetization $Ms_1$ of the first magnetic layer 4 ($Ms_2 \geq Ms_1$). Since a difference between the saturation magnetization $Ms_1$ of the first magnetic layer 4 and the saturation magnetization $Ms_2$ of the second magnetic layer 5 exercises an influence on the creation of a front mask in the MSR operation, it is desirable that the saturation magnetization is larger than $8.80 \times 10^{-2}$ Wb/m² (70 emu/cc). In order to suppress the increase in jitter or a decrease in recording power margin, it is desirable that the saturation magnetization is less than $1.76 \times 10^{-1}$ Wb/m². Therefore, typically, the saturation magnetization $Ms_2$ of the second magnetic layer 5 is selected from a range of $8.80 \times 10^{-2}$ to $1.76 \times 10^{-1}$ Wb/m² (70 to 140 emu/cc), preferably, from a range of $1.13 \times 10^{-1}$ to $1.34 \times 10^{-1}$ Wb/m² (90 to 107 emu/cc). In the embodiment, for example, $1.22 \times 10^{-1}$ Wb/m² (97 emu/cc) or $1.34 \times 10^{-1}$ Wb/m² (107 emu/cc) is selected. The saturation magnetization $Ms_2$ decreases monotonously down to the Curie temperature $Tc_2$. Details regarding the saturation magnetization $Ms_2$ of the second magnetic layer 5 will be explained hereinlater.

The third magnetic layer 6 formed on the second magnetic layer 5 is made of, for example, a rare earth alloy (TbFeCo) film comprising Tb as a rare earth metal and Fe and Co as transition metals. The third magnetic layer 6 is TM rich and has an axis of easy magnetization in the perpendicular direction. The third magnetic layer 6 causes a magnetooptic effect and is used to record the information signal. In the third magnetic layer 6, saturation magnetization $Ms_3$ at room temperature lies within a range from $8.80 \times 10^{-2}$ to $1.88 \times 10^{-2}$ Wb/m² (70 to 150 emu/cc) and rises together with a temperature up to about 150° C. A Curie temperature $Tc_3$ is equal to about 300° C. A value of a coercive force $Hc_3$ at room temperature is equal to or larger than $7.96 \times 10^5$ A/m (10 kOe). A film thickness of the third magnetic layer 6 is equal to, for example, 45 nm.

A multilayer magnetic film 10 which enables the MSR operation is constructed by the first magnetic layer 4, second magnetic layer 5, and third magnetic layer 6 mentioned above. The Curie temperatures $Tc_1$, $Tc_2$, and $TC_3$ in the first magnetic layer 4, second magnetic layer 5, and third magnetic layer 6 satisfy the relations of $Tc_2 < Tc_1$ and $Tc_2 < Tc_3$. The coercive forces $Hc_1$ and $HC_3$ at room temperature of the first magnetic layer 4 and the third magnetic layer 6 satisfy the relation of $Hc_3 > Hc_1$.

The second dielectric layer 7 formed on the third magnetic layer 6 is made of, for example, $Si_3N_4$ having a film thickness of 30 nm. The second dielectric layer 7 is a layer to optically enhance the magnetooptic effect of the third magnetic layer 6 in a manner similar to the first dielectric layer 3 and to protect the third magnetic layer 6 from the moisture or the like.

The reflective layer 8 formed on the second dielectric layer 7 is made of an alloy of Al, silver (Ag), and the like having a film thickness of about 10 nm. In the embodiment, the reflective layer 8 is made of, for example, aluminum titanium alloy (AlTi). The reflective layer 8 is provided to diffuse heat propagated to the third magnetic layer 6. By diffusing the heat in the reflective layer 8, a size of recording mark in the third magnetic layer 6 is controlled and a temperature profile in the multilayer magnetic film 10 can be controlled. Thus, recording and reproducing characteristics are maintained in a good state.

The protective layer 9 formed on the reflective layer 8 is made of, for example, an ultraviolet curing resin. The protective layer 9 is used to protect the first dielectric layer 3, first magnetic layer 4, second magnetic layer 5, third magnetic layer 6, second dielectric layer 7, and reflective layer 8 formed on the disk substrate 2.

The recording/reproduction to/from the magnetooptic disk 1 constructed as mentioned above are executed by irradiating a laser beam $L_1$ to the magnetooptic disk 1 from the side where the disk substrate 2 exists.

Subsequently, a manufacturing method of the magnetooptic disk 1 according to the embodiment constructed as mentioned above will be described.

In the manufacturing method of the magnetooptic disk 1 according to the embodiment, first, the disk substrate 2 made of, for example, PC is formed by an injection molding method. At this time, lands and grooves for optically tracking are formed on one principal plane of the disk substrate 2. In the embodiment, it is assumed that reproducing light of the magnetooptic disk 1 is a laser beam whose wavelength is equal to about 635 nm, a numerical aperture (NA) of an optical system which is used is equal to about 0.58, in this instance, the track pitch Tp is selected from a range from $0.47 \cdot \lambda/NA$ μm to $0.83 \cdot \lambda/NA$ μm. The track pitch Tp is set to about 0.67 μm here.

Subsequently, the disk substrate 2 is conveyed into a vacuum chamber and put at a predetermined position therein. Subsequently, mixture gases of, for example, an argon (Ar) gas and a nitrogen ($N_2$) gas are used and an SiN film is formed on the disk substrate 2 by a reactive sputtering method using an Si target. Thus, the first dielectric layer 3 made of SiN is formed on the disk substrate 2. A gas pressure in the reactive sputtering method is equal to, for example, 1.5 Pa.

Subsequently, the disk substrate 2 on which the first dielectric layer 3 has been formed is conveyed into a vacuum chamber in which a target made of GdFeCo has been put and is put at a predetermined position therein. After that, a GdFeCo film is formed on the first dielectric layer 3 by, for example, a sputtering method. Thus, the first magnetic layer 4 made of GdFeCo is formed. When an example of forming conditions of the first magnetic layer 4 is mentioned, the Ar gas is used as an atmosphere gas and a pressure is set to 4.0 Pa.

Subsequently, the disk substrate 2 formed with the first magnetic layer 4 is conveyed into a vacuum chamber in which the GdFeCoSi target has been put and is put at a predetermined position therein. After that, a GdFeCoSi film is formed on the first magnetic layer 4 by the sputtering method. Thus, the second magnetic layer 5 made of GdFeCoSi is formed. In the creation of the film of the second magnetic layer 5, the Ar gas is used as an atmosphere gas. According to the knowledge obtained by experiments by the inventors et al., it is desirable to set a gas pressure to 3 Pa or less in order to weaken the perpendicular magnetic anisotropy in the second magnetic layer 5 and to enable the copy transfer from the third magnetic layer 6 to the first magnetic layer 4 to be easily executed. According to the experiments made by the inventors et al. in which the gas pressure is set to a low pressure, if the gas pressure is set to be equal to or less than 0.6 Pa, an abnormal discharge is caused. Therefore, it is desirable to set a gas pressure p to be larger than 0.6 Pa. Thus, the gas pressure p at the time when the film of the second magnetic layer 5 is formed is selected so as to be larger than 0.6 Pa and is equal to or less than 3 Pa (0.6 Pa<p≦3 Pa). Further, a value near p=1 Pa is most desirable in terms of a viewpoint of assuring the characteristics.

Subsequently, the disk substrate 2 formed with the second magnetic layer 5 is conveyed into the vacuum chamber in which a target made of TbFeCo has been put and is put at a predetermined position. After that, a TbFeCo film is formed on the second magnetic layer 5 by, for example, the sputtering method. Thus, the third magnetic layer 6 made of TbFeCo is formed on the second magnetic layer 5. When an example of forming conditions of the third magnetic layer 6 is mentioned, the Ar gas is used as an atmosphere gas and a pressure is set to 4.5 Pa. As a material constructing the third magnetic layer 6, DyFeCo or GdFeCo other than TbFeCo can be used. The third magnetic layer 6 can be also replaced with a multilayer structure obtained by laminating those alloy films.

Subsequently, the disk substrate 2 formed with the third magnetic layer 6 is conveyed into the vacuum chamber in which a target made of Si has been put and is put at a predetermined position. Subsequently, an SiN film is formed on the disk substrate 2 by using mixture gases of, for example, the Ar gas and $N_2$ gas and by the reactive sputtering method using the Si target. Thus, the second dielectric layer 7 made of SiN is formed on the disk substrate 2. A gas pressure in there active sputtering method is equal to, for example, 1.0 Pa.

Subsequently, the disk substrate 2 formed with the second dielectric layer 7 is conveyed into the vacuum chamber in which an AlTi target has been put and is put at a predetermined position. Subsequently, an AlTi film is formed on the first dielectric layer 3 by using, for example, the Ar gas as an atmosphere gas and by the sputtering method using the target made of AlTi. Thus, the reflective layer 8 made of AlTi is formed on the second dielectric layer 7. When an example of sputtering conditions in the creation of the reflective layer 8 is mentioned, the Ar gas is used as a gas and a pressure is set to 1.0 Pa.

After that, the disk substrate 2 formed with all films is conveyed out of the sputtering chamber.

Subsequently, the disk substrate 2 formed with all layers is coated with an organic resin material, specifically speaking, the ultraviolet curing resin by, for example, a spin coating method, and the organic resin material is cured by using ultraviolet rays, thereby forming the protective layer 9.

Thus, a desired magnetooptic disk 1 according to the embodiment is manufactured.

Subsequently, recording and reproducing characteristics of the magnetooptic disk 1 mentioned above are evaluated. That is, the magnetooptic disks 1 in which the saturation magnetization $Ms_2$ of the second magnetic layer 5 is set to 0.122 Wb/m², 0.134 Wb/m², and 0.188 Wb/m² are manufactured in accordance with the foregoing manufacturing method. Recording and reproducing characteristics of those magnetooptic disks 1 are evaluated by using an evaluating apparatus. A wavelength of the laser beam which is used in the evaluating apparatus is equal to 635 nm and an NA of an objective lens is equal to 0.58. First, the shortest mark length is set to 0.3 μm and marks of a random pattern which is 1–7 modulated are recorded on each of the land and the groove on one principal plane of each of the magnetooptic disks 1.

After that, reproduction is performed by a proper reproducing power and recording power margin dependency of a jitter in the reproduction is evaluated. Evaluation results in the land of jitter characteristics in the evaluation are shown in FIG. 3 and evaluation results in the groove are shown in FIG. 4.

Figure 3:
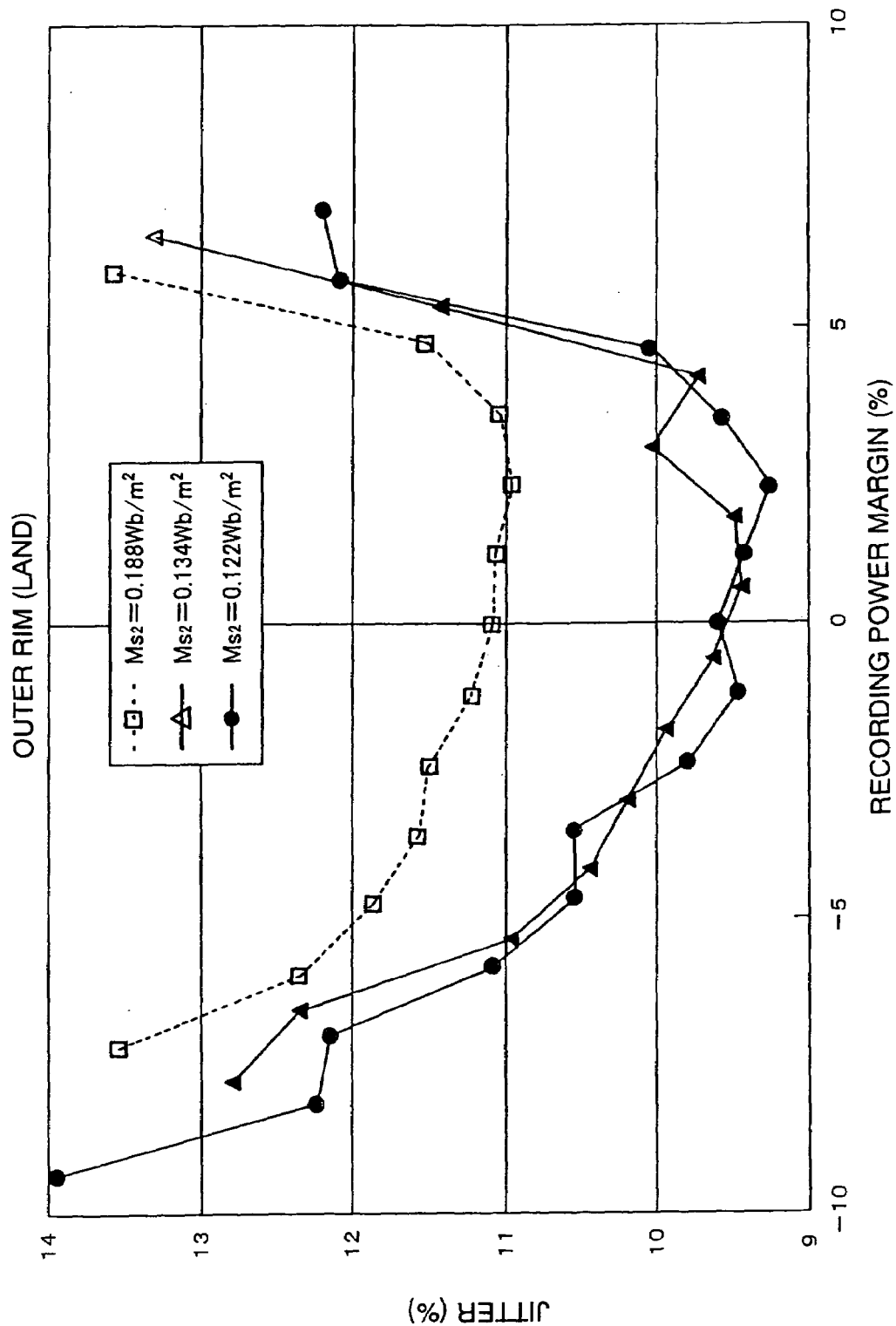
FIG. 3 is a graph showing recording power margin dependency of a jitter in a land of an outer rim portion of the magnetooptic disk according to the embodiment of the invention.

It will be understood from FIG. 3 that in the land of the magnetooptic disk 1 in which the saturation magnetization $Ms_2$ of the second magnetic layer 5 is equal to 0.188 Wb/m², the minimum value of the jitter is equal to 11.0%, in the magnetooptic disk 1 in which the saturation magnetization $Ms_2$ of the second magnetic layer 5 is equal to 0.134 Wb/m², the minimum value of the jitter is equal to about 9.4%, and in the magnetooptic disk 1 in which the saturation magnetization $Ms_2$ of the second magnetic layer 5 is equal to 0.122 Wb/m², the minimum value of the jitter is equal to about 9.2%. That is, it will be understood that by setting the saturation magnetization $Ms_2$ of the second magnetic layer 5 to 0.134 Wb/m² or 0.122 Wb/m², the jitter can be improved by about 1.5% without narrowing the recording power margin as compared with the magnetooptic disk 1 in which the saturation magnetization $Ms_2$ of the second magnetic layer 5 is equal to 0.188 Wb/m².

Figure 4:
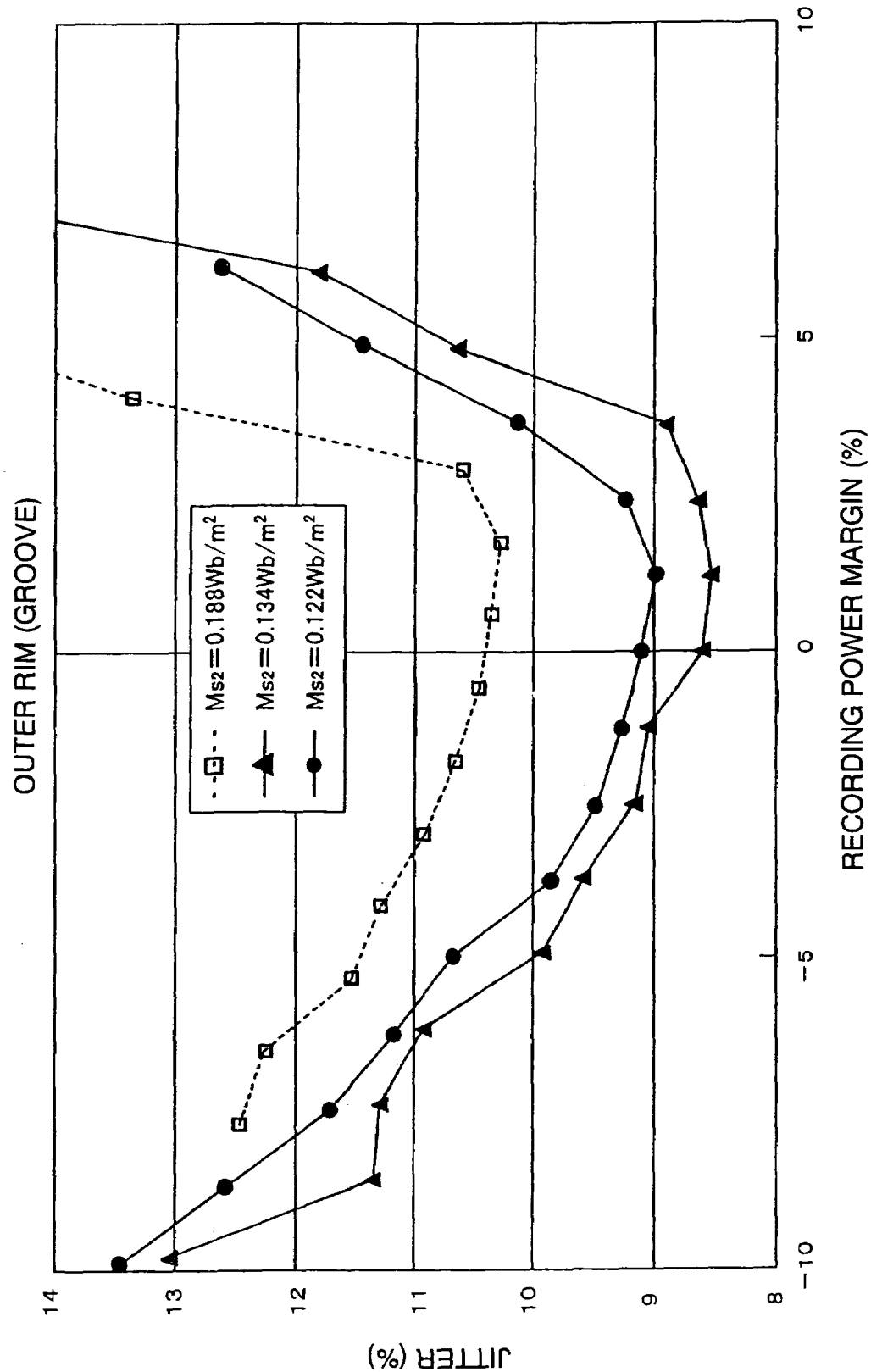
FIG. 4 is a graph showing recording power margin dependency of a jitter in a groove of the outer rim portion of the magnetooptic disk according to the embodiment of the invention.

It will be understood from FIG. 4 that in the groove of the magnetooptic disk 1 in which the saturation magnetization $Ms_2$ of the second magnetic layer 5 is equal to 0.188 Wb/m², the minimum value of the jitter is equal to about 10.3%, in the magnetooptic disk 1 in which the saturation magnetization $Ms_2$ of the second magnetic layer 5 is equal to 0.134 Wb/m², the minimum value of the jitter is equal to about 8.5%, and in the magnetooptic disk 1 in which the saturation magnetization $Ms_2$ of the second magnetic layer 5 is equal to 0.122 Wb/m², the minimum value of the jitter is equal to about 9.0%. That is, it will be understood that by setting the saturation magnetization $Ms_2$ of the second magnetic layer 5 to 0.134 Wb/m², the jitter can be improved by about 1.8% without narrowing the recording power margin as compared with the magnetooptic disk 1 in which the saturation magnetization $Ms_2$ of the second magnetic layer 5 is equal to 0.188 Wb/m², and by setting the saturation magnetization $Ms_2$ of the second magnetic layer 5 to 0.122 Wb/m², the jitter can be improved by about 1.3% without narrowing the recording power margin as compared with the magnetooptic disk 1 in which the saturation magnetization $MS_2$ of the second magnetic layer 5 is equal to 0.188 Wb/m².

The inventors of the present invention evaluated recording power margin dependency of the jitter in the magnetooptic disks 1 (embodiments) according to the invention and the conventional magnetooptic disks (comparison examples). The evaluation of the recording power margin dependency of the jitter is made with respect to the land and the groove in each of an inner rim (radius r=24.5 mm) portion and an outer rim (radius r=40.5 mm) portion in the magnetooptic disks according to the prior art and the magnetooptic disks according to the invention, respectively.

Figure 5:
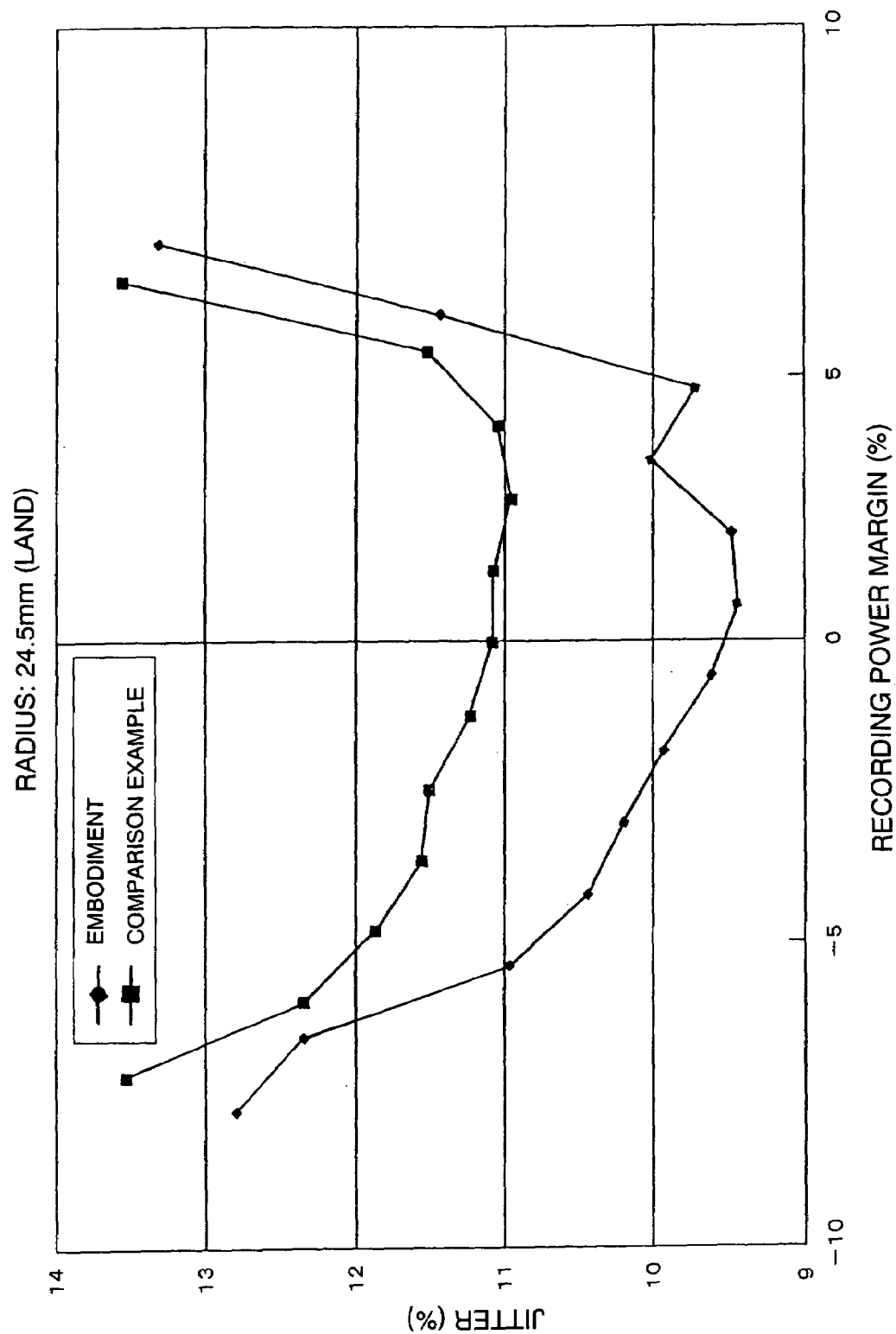
FIG. 5 is a graph showing recording power margin dependency of a jitter in a land of an inner rim portion of the magnetooptic disk according to the embodiment of the invention.
Figure 6:
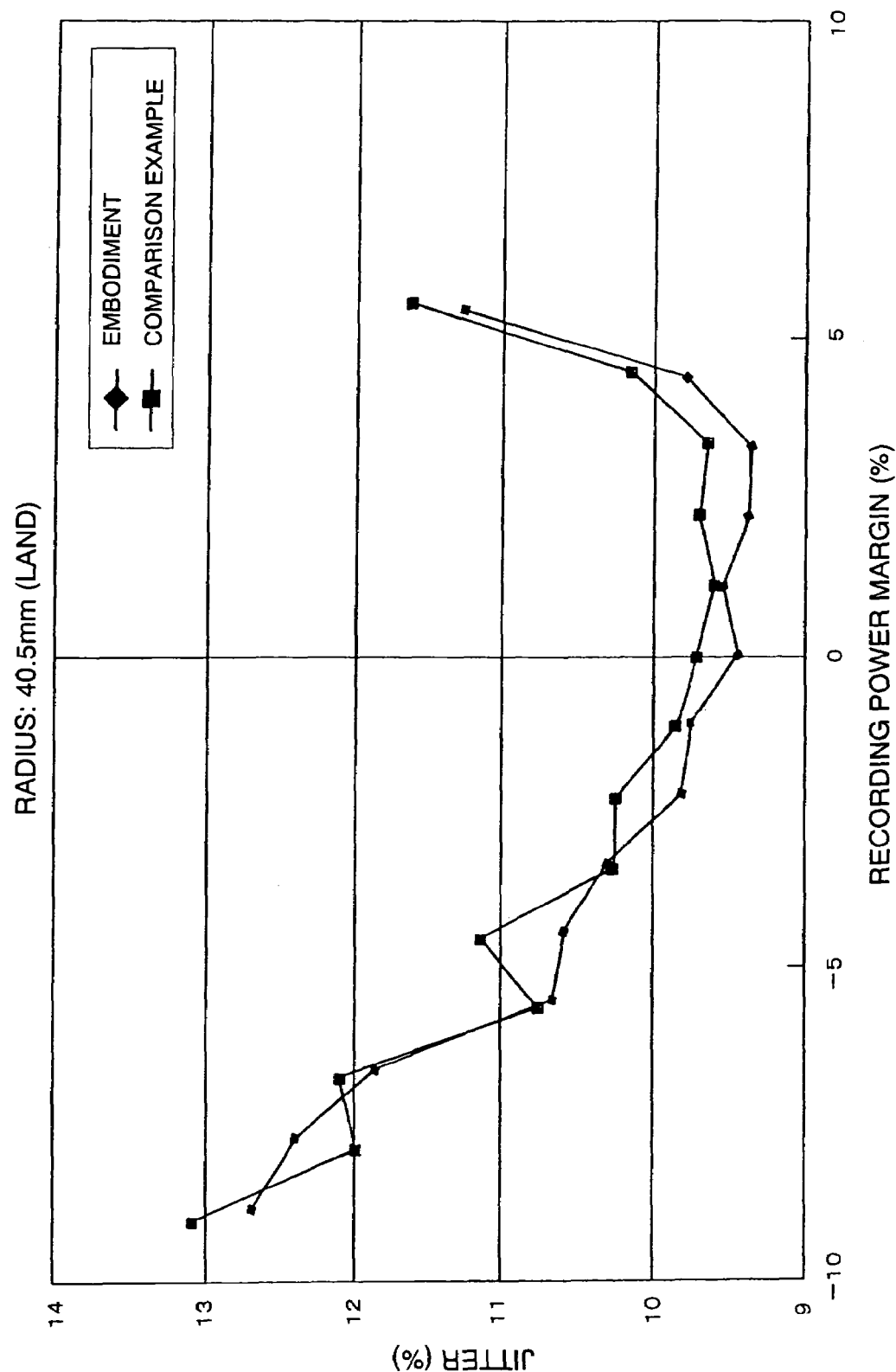
FIG. 6 is a graph showing recording power margin dependency of a jitter in a land of the outer rim portion of the magnetooptic disk according to the embodiment of the invention.
Figure 7:
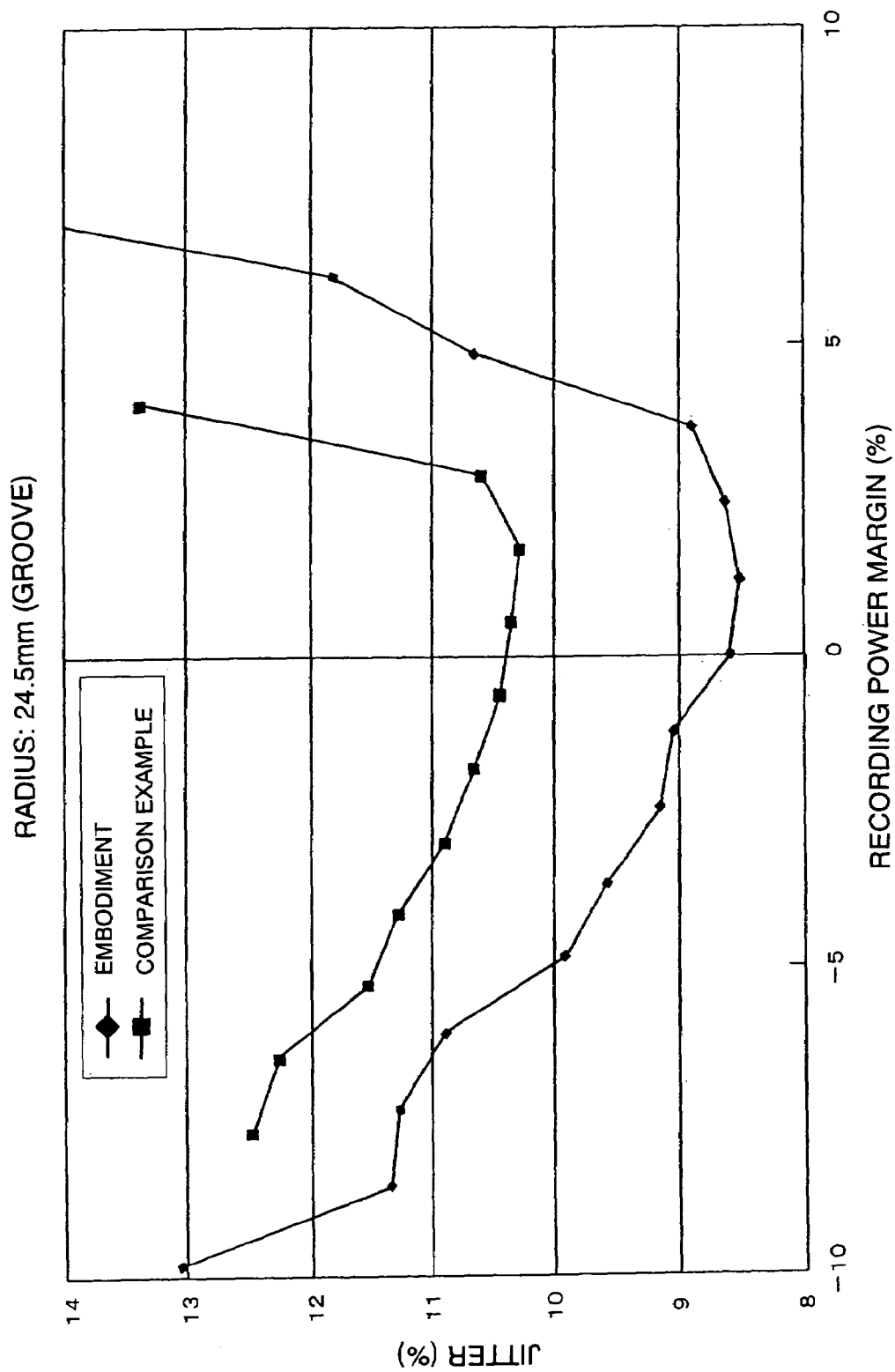
FIG. 7 is a graph showing recording power margin dependency of a jitter in a groove of the inner rim portion of the magnetooptic disk according to the embodiment of the invention.
Figure 8:
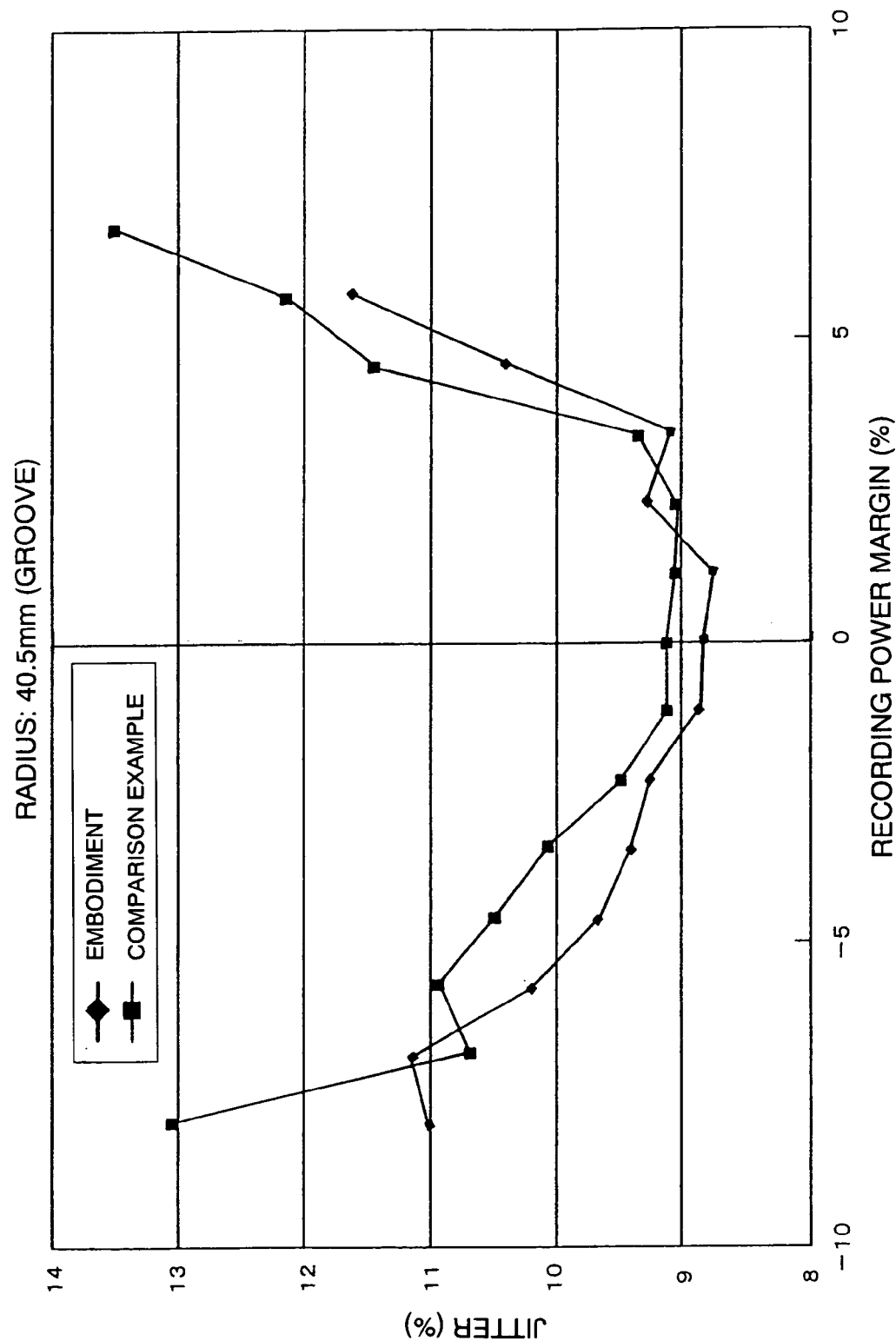
FIG. 8 is a graph showing recording power margin dependency of a jitter in a groove of the outer rim portion of the magnetooptic disk according to the embodiment of the invention.

FIG. 5 shows recording power dependency of a jitter in a land of an inner rim portion of each of the magnetooptic disks according to the invention and the prior art. FIG. 6 shows recording power dependency of a jitter in a land of an outer rim portion of each of the magnetooptic disks according to the invention and the prior art. FIG. 7 shows recording power dependency of a jitter in a groove of the inner rim portion of each of the magnetooptic disks according to the invention and the prior art. FIG. 8 shows recording power dependency of a jitter in a groove of the outer rim portion of each of the magnetooptic disks according to the invention and the prior art.

It will be understood from FIG. 5 that in the land of the inner rim portion of the magnetooptic disk (comparison example) according to the prior art, the minimum value of the jitter is equal to about 11% and in the land of the inner rim portion of the magnetooptic disk (embodiment) according to the invention, the minimum value of the jitter is equal to 9.3%. Therefore, according to the magnetooptic disk 1 of the invention, it will be understood that the jitter is improved by 1.7% as compared with the conventional one. It will be understood from FIG. 6 that in the outer rim portion of the magnetooptic disk, in the magnetooptic disk according to the prior art and the magnetooptic disk 1 according to the invention, tendencies of the recording power dependency of the jitter are almost similar and ratios of improvement in the minimum value of the jitter are equal to up to about 0.1%. Therefore, it will be understood from FIGS. 5 and 6 mentioned above that in the magnetooptic disk according to the invention, the jitter characteristics of the land in the inner rim portion can be made to approach the jitter characteristics of the outer rim portion and a change in jitter due to a recording power in each of the inner rim portion and the outer rim portion of the magnetooptic disk can be reduced.

It will be understood from FIG. 7 that in the groove in the inner rim portion of the magnetooptic disk (comparison example) according to the prior art, the minimum value of the jitter is equal to about 10.2% and in the groove in the inner rim portion of the magnetooptic disk (embodiment) according to the invention, the minimum value of the jitter is equal to 8.6%. Therefore, according to the magnetooptic disk 1 of the invention, it will be understood that the jitter in the groove in the inner rim is improved by about 1.6% as compared with the conventional one. It will be understood from FIG. 8 that in the outer rim portion of the magnetooptic disk, in the magnetooptic disk according to the prior art and the magnetooptic disk according to the invention, tendencies of the recording power dependency of the jitter of the groove in the outer rim portion are almost similar and the minimum value of the jitter hardly changes. It will be understood from FIGS. 7 and 8 mentioned above that in the magnetooptic disk 1 according to the invention, the jitter characteristics of the land in the inner rim portion can be made to approach the jitter characteristics of the outer rim portion. Thus, it will be understood that the change in jitter due to the recording power in each of the inner rim portion and the outer rim portion of the magnetooptic disk can be reduced.

Therefore, from FIGS. 5 to 8, according to the magnetooptic disk 1 according to the invention, the jitter characteristics of the inner rim portion can be made to approach the jitter characteristics of the outer rim portion and the recording and reproducing characteristics of the magnetooptic disk can be almost equalized on the whole surface of the disk. Thus, the reliability of the magnetooptic disk can be improved.

Figure 9:
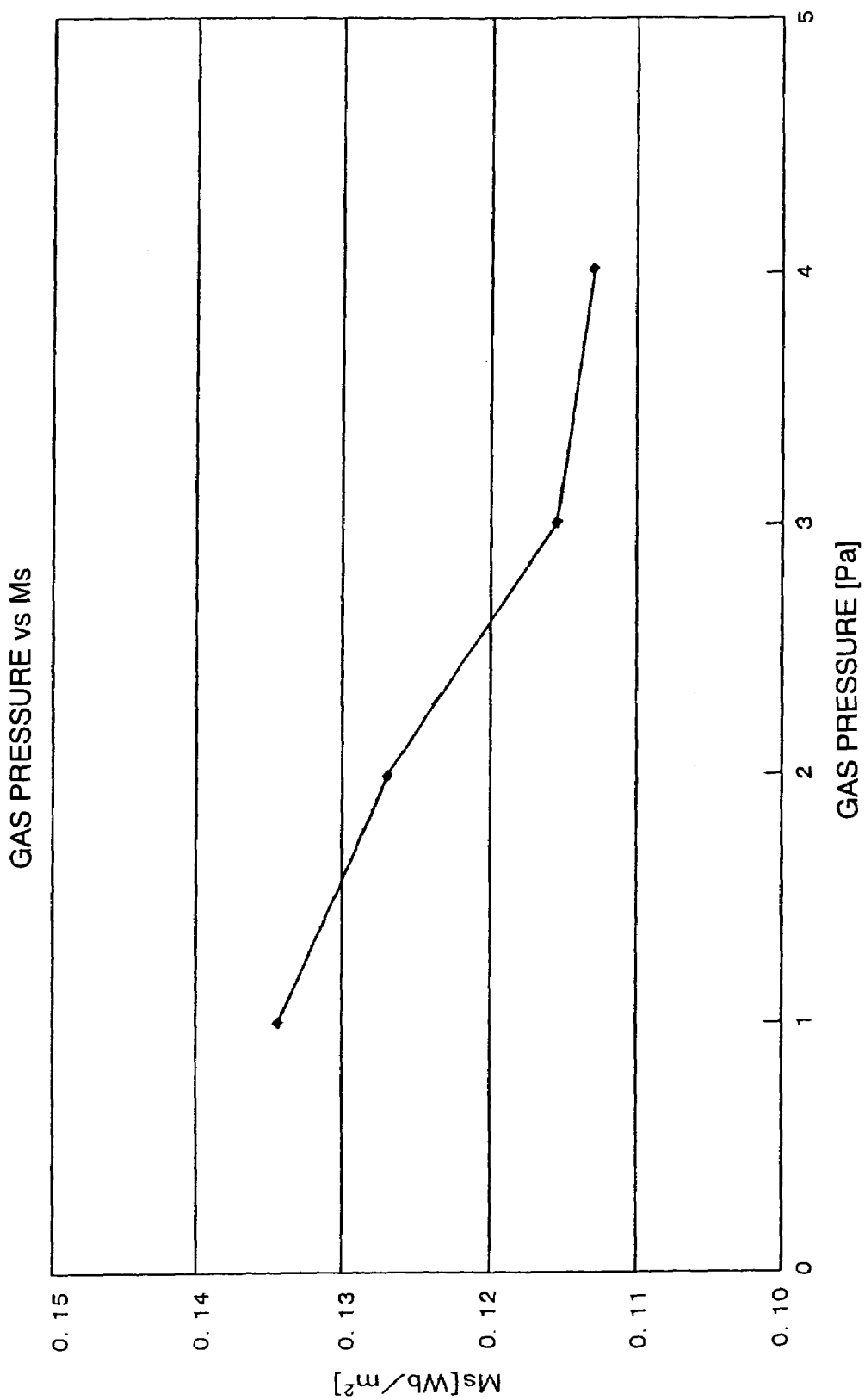
FIG. 9 is a graph showing gas pressure dependency of saturation magnetization $Ms_2$ in the second magnetic layer according to the embodiment of the invention upon film creation.
Figure 10:
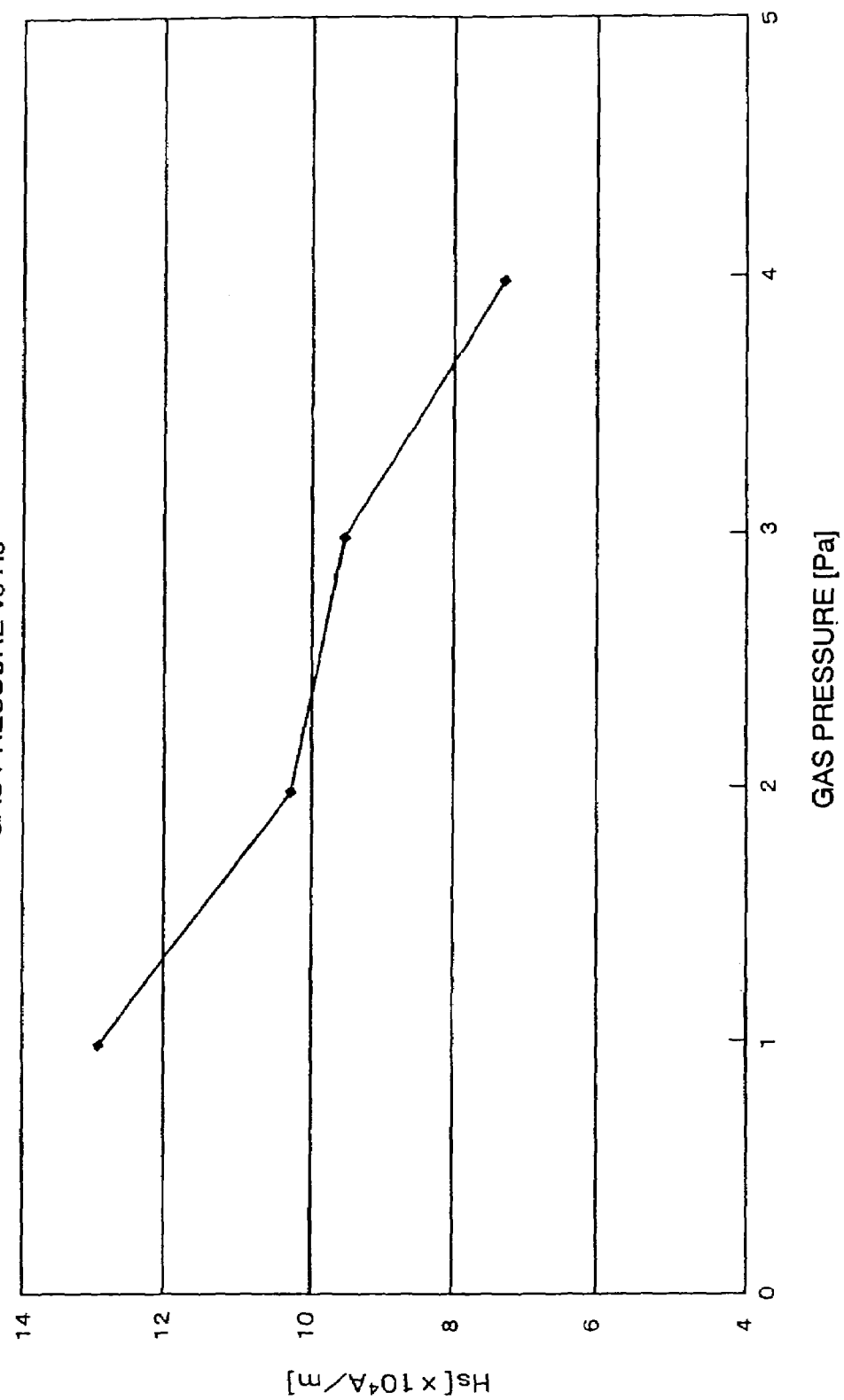
FIG. 10 is a graph showing gas pressure dependency of a saturation magnetic field Hs in the second magnetic layer according to the embodiment of the invention upon film creation.

The inventors of the present invention executed various experiments with regard to the film creation of the second magnetic layer 5. FIG. 9 shows gas pressure dependency in the saturation magnetization $Ms_2$ of the second magnetic layer 5 upon film creation. FIG. 10 shows gas pressure dependency in the saturation magnetic field $Hs_2$ of the second magnetic layer 5 upon film creation. The saturation magnetization $Ms_2$ shown in FIG. 9 shows a value obtained by a method whereby a GdFeCoSi film having a film thickness of 300 nm is formed, its saturation magnetization is measured, and thereafter, it is converted into the film thickness of about 34 nm. The saturation magnetic field $Hs_2$ shown in FIG. 10 shows a value measured after the GdFeCoSi film having a film thickness of 40 nm is formed.

It will be understood from FIGS. 9 and 10 that as the gas pressure upon film creation of the second magnetic layer 5 is reduced and a vacuum degree becomes higher, the saturation magnetization $Ms_2$ and the saturation magnetic field Hs in the second magnetic layer 5 increase, respectively. Specifically speaking, it will be understood from FIG. 9 that when the gas pressure upon film creation of the second magnetic layer 5 is set to 4 Pa, the saturation magnetization $Ms_2$ of the second magnetic layer 5 is equal to about 0.113 $Wb/m^2$ (90 emu/cc), whereas when the gas pressure is set to 1 Pa, the saturation magnetization $Ms_2$ of the second magnetic layer 5 increases to about 0.134 $Wb/m^2$ (107 emu/cc), that is, increased by about 0.21 $Wb/m^2$ (17 emu/cc). It will be also understood from FIG. 10 that when the gas pressure upon film creation of the second magnetic layer 5 is set to 4 Pa, the saturation magnetic field Hs is equal to about $7.32 \times 10^4$ A/m (0.92 kOe), whereas when the gas pressure is set to 1 Pa, the saturation magnetic field Hs increases to about $1.29 \times 10^5$ A/m (1.62 kOe), that is, increased by about $5.6 \times 10^4$ A/m (0.7 kOe). Further, it has been confirmed that even though the gas pressure upon film creation of the second magnetic layer 5 is changed to various values, the Curie temperature $Tc_2$ is held at about 190° C. It will be understood from the above experiments that the perpendicular magnetic anisotropy can be controlled by changing the gas pressure upon film creation of the second magnetic layer 5. Therefore, as mentioned-above, in the embodiment, it will be understood that the gas pressure upon film creation of the second magnetic layer 5 is set to be larger than 0.6 Pa in order to suppress an abnormal discharge, it is set to be equal to or less than 3 Pa in order to obtain desired characteristics, and most preferably, it is set to a value near 1 Pa.

Figure 14:
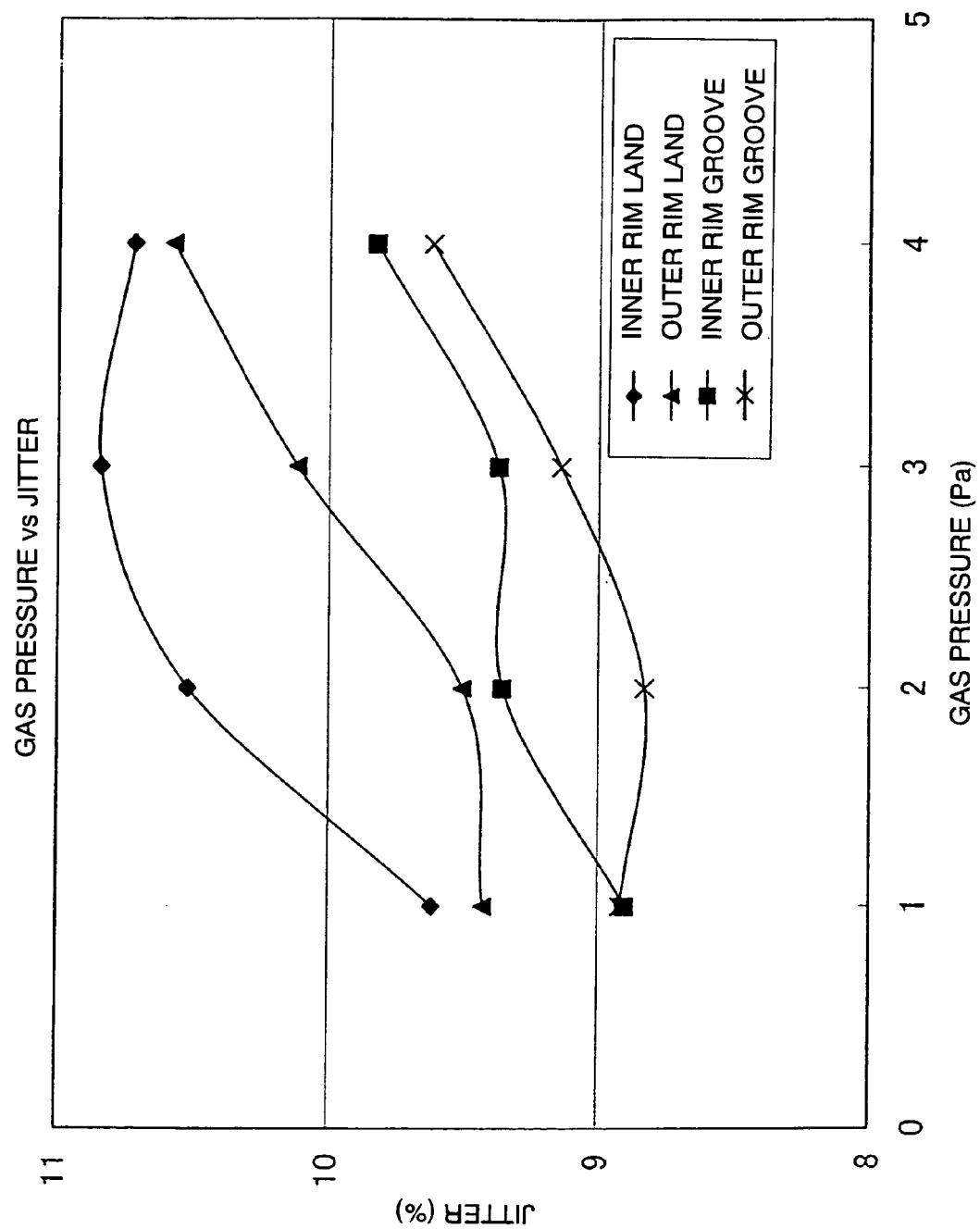
FIG. 14 is a graph showing gas pressure dependency of the jitters in the land and the groove in the inner rim portion and the outer rim portion of the magnetooptic disk according to the embodiment of the invention when the second magnetic layer is formed as a film.

FIG. 14 shows gas pressure dependency in the land and the groove in the outer rim portion and the inner rim portion of the magnetooptic disk according to the embodiment when the second magnetic layer 5 is formed as a film. It will be understood from FIG. 14 that in the magnetooptic disk according to the embodiment, the jitter characteristics are improved by setting the gas pressure upon film creation of the second magnetic layer 5 to 3 Pa or less. It will be also understood that particularly in the groove, by setting the gas pressure upon film creation of the second magnetic layer 5 to 3 Pa or less, the jitters in the inner rim portion and the outer rim portion of the magnetooptic disk are equal to or less than 9.5%. It will be further understood that in the land, the jitters are equal to or less than 11% in a manner similar to that mentioned above and the magnetooptic disk which is applied to the practical use can be manufactured. It will be also understood that it is preferable to set the gas pressure to a value near 1 Pa in order to assure the good jitter characteristics.

Figure 11:
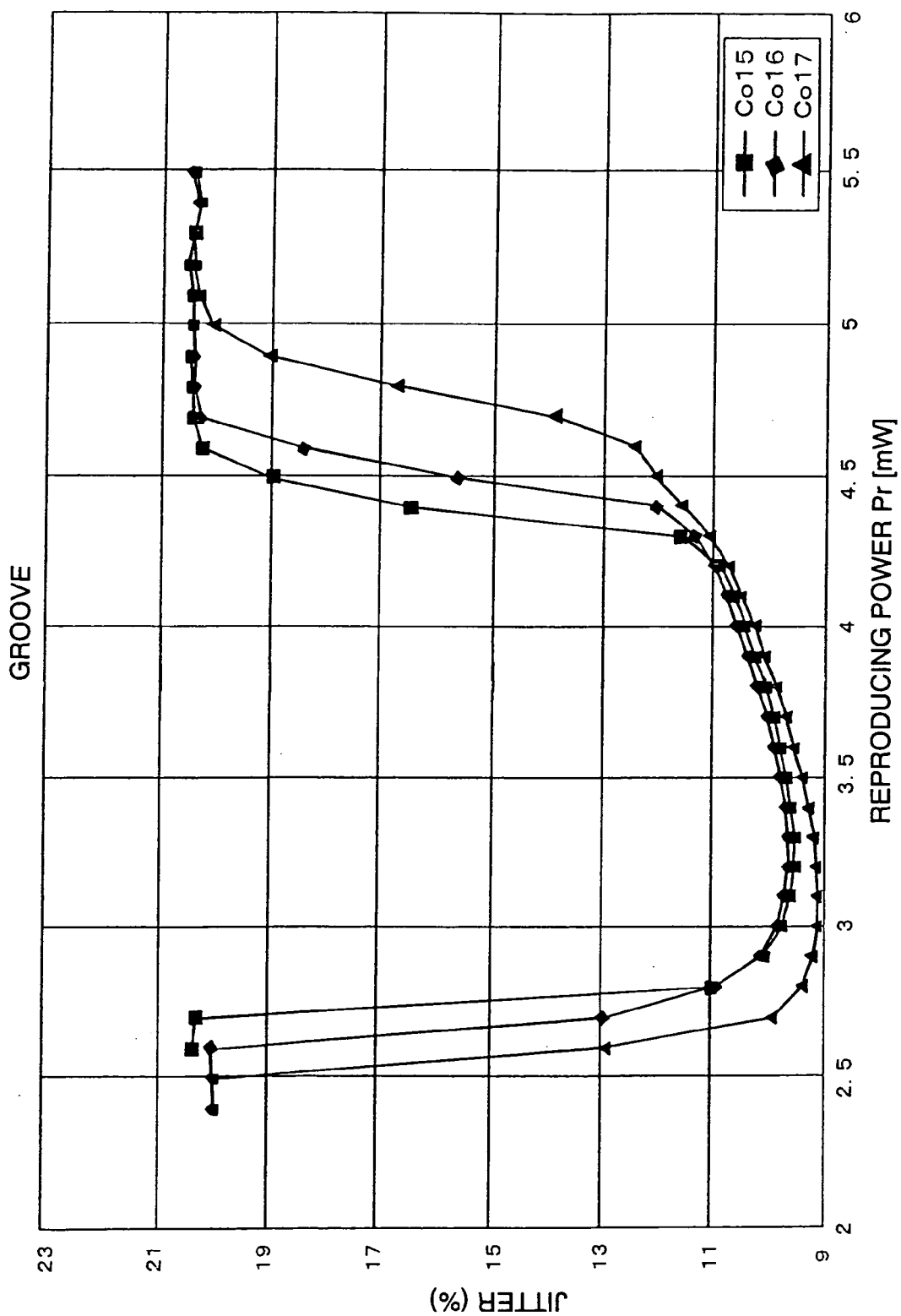
FIG. 11 is a graph showing reproducing power dependency of the jitter in the groove when a Co composition in the third magnetic layer of the magnetooptic disk according to the embodiment of the invention is changed.
Figure 12:
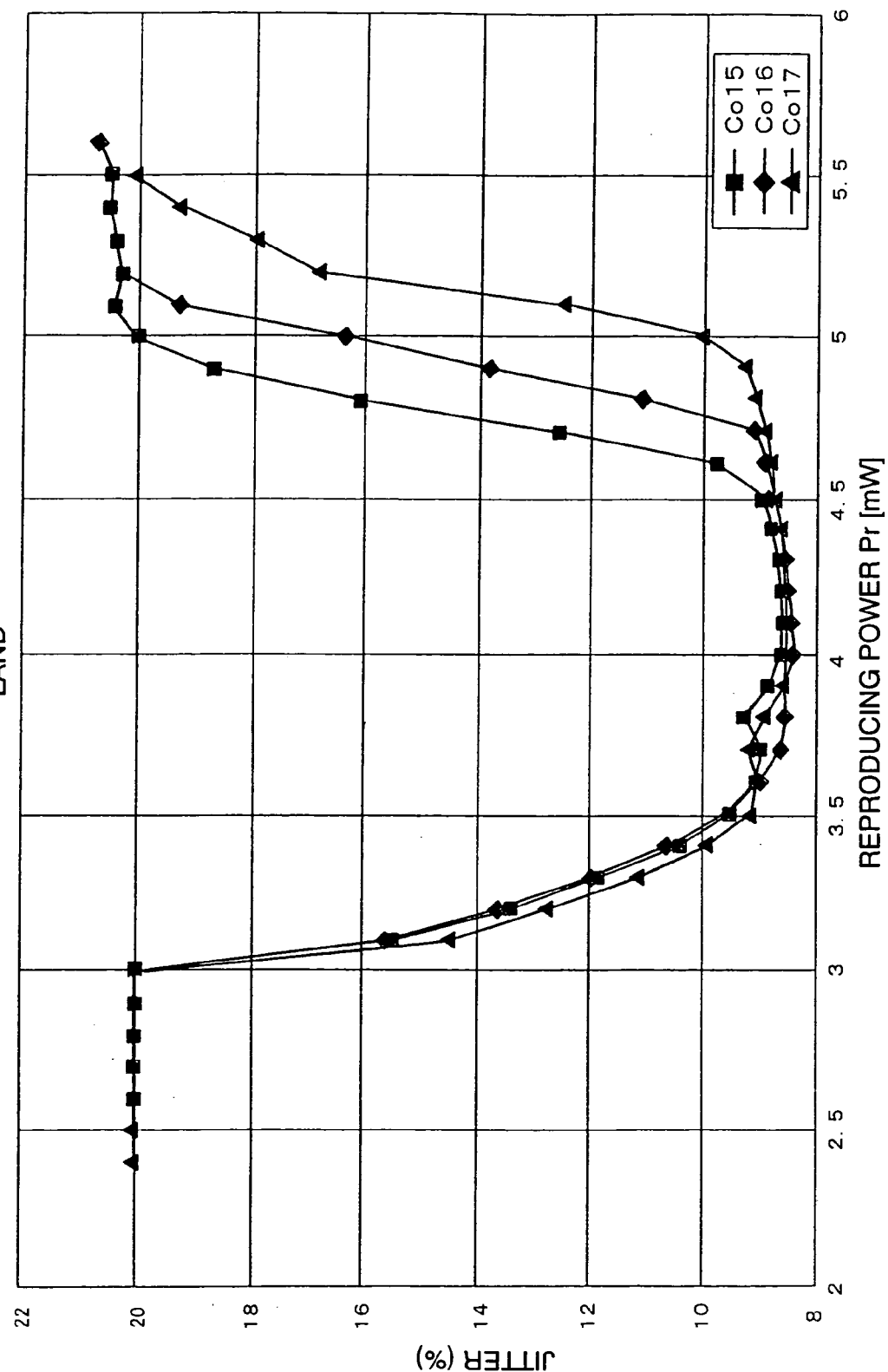
FIG. 12 is a graph showing reproducing power dependency of the jitter in the land when the Co composition in the third magnetic layer of the magnetooptic disk according to the embodiment of the invention is changed.

In the step of making experiments and examining reproducing and recording sensitivity, the inventors of the present invention make various experiments regarding a content ratio of Co in the compositions in the third magnetic layer 6. That is, in the cases where the third magnetic layer 6 is made of TbFeCo, a content ratio of Tb is fixed to 22.5 atom %, a content ratio of Co is set to 15 atom %, 16 atom %, and 17 atom %, and a content ratio of Fe is changed and adjusted, in other words, in the cases where the third magnetic layer 6 is made of $Tb_{22.5}Fe_{77.5-x}Co_x$, x=15, x=16, and x=17, reproducing power Pr dependency of the jitters in the groove and the land in the magnetooptic disk is evaluated. FIG. 11 shows the reproducing power Pr dependency of the jitter in the groove. FIG. 12 shows the reproducing power Pr dependency of the jitter in the land.

It will be understood from FIG. 11 that with respect to the jitter characteristics in the groove of the magnetooptic disk, when a content ratio x of Co is increased from x=15 to x=17, the reproducing power margin also increases. It will be understood from FIG. 12 that also with respect to the jitter characteristics in the land of the magnetooptic disk, when a content ratio x of Co is increased from x=15 to x=17, the reproducing power margin also increases. Therefore, with respect to both of the land and the groove of the magnetooptic disk, in order to assure the reproducing power margin which is large enough, it is desirable to set the content ratio of Co to 15 atom % or more and to set the content ratio of Co to be large.

On the other hand, in the cases where the third magnetic layer 6 is made of $Tb_{22.5}Fe_{77.5-x}Co_x$, x=15, x=16, and x=17 in a manner similar to those in the foregoing evaluation, the inventors of the present invention evaluated recording power Pw dependency of the jitter in the land of the magnetooptic disk 1. Results of the evaluation of the recording power Pw dependency of the jitter are shown in FIG. 13.

Figure 13:
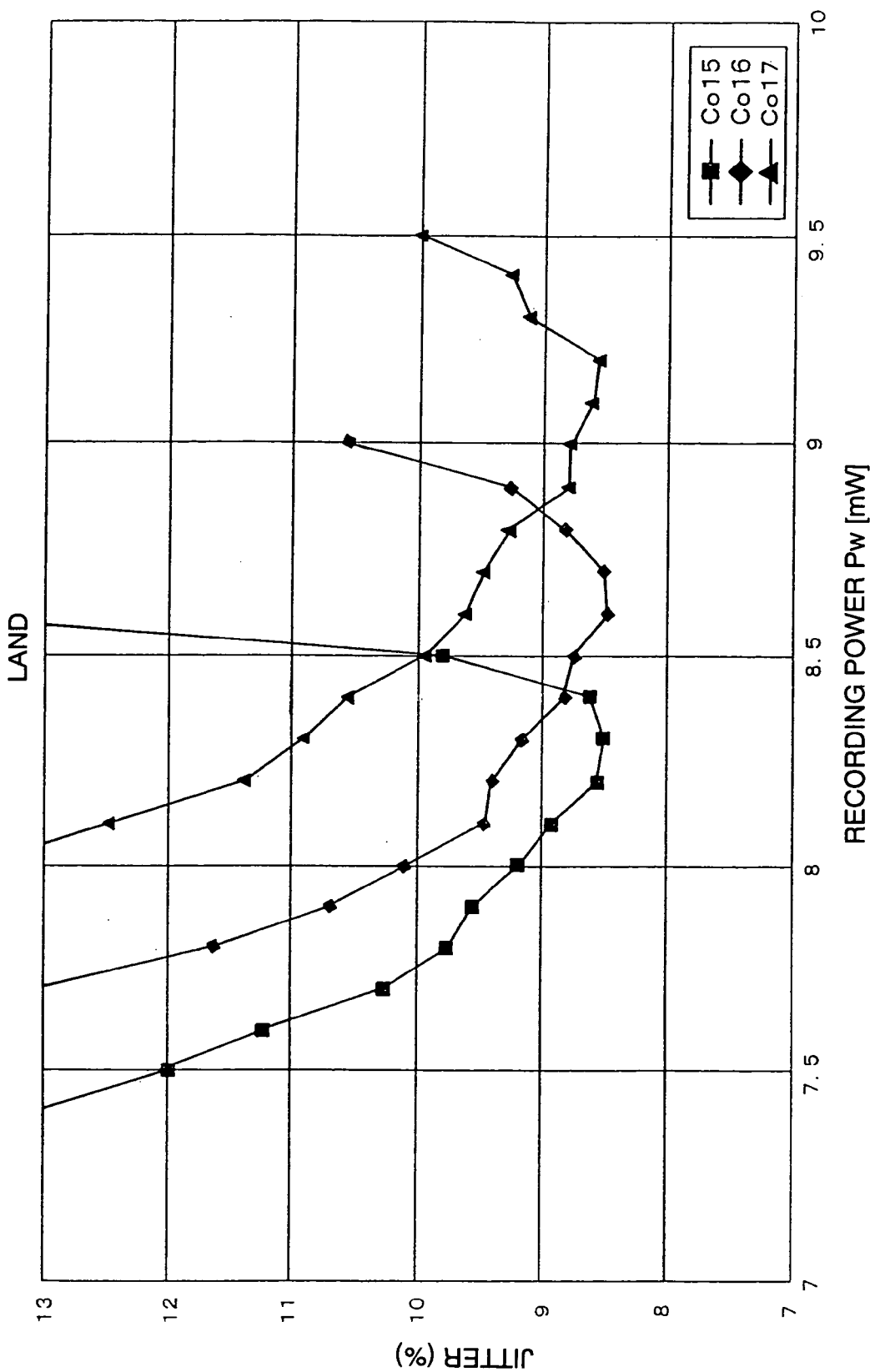
FIG. 13 is a graph showing recording power dependency of the jitter in the land when the Co composition in the third magnetic layer of the magnetooptic disk according to the embodiment of the invention is changed.

It will be understood from FIG. 13 that when the content ratio x of Co is increased from x=15 to x=17, the value of the recording power Pw at the time when the jitter is equal to the minimum value increases. That is, when the content ratio of Co is set to 15 atom % (x=15), the recording power Pw at the time when the jitter is equal to the minimum value is equal to 8.3 mW. When the content ratio of Co is set to 16 atom % (x=16), the recording power Pw at the time when the jitter is equal to the minimum value is equal to 8.6 mW. When the content ratio of Co is set to 17 atom % (x=17), the recording power Pw at the time when the jitter is equal to the minimum value increases to 9.2 mW. It is caused because the Curie temperature rises due to an increase in content ratio of Co. By increasing the content ratio of Co as mentioned above, the recording power Pw which is optimum to the recording of the information signal increases. When the recording power Pw is increased, a leakage to the adjacent track increases and there is a case where a crosstalk is generated. Therefore, it will be understood that from a viewpoint of reduction in recording power Pw, in order to raise the sensitivity, it is desirable that the content ratio of Co is smaller.

It will be understood from the results shown in FIGS. 11 to 13 mentioned above that it is desirable to select the content ratio of Co from a range of 15 to 17 atom %, preferably, from a range where it is larger than 15 atom % and is less than 17 atom %, more preferably, the content ratio of Co is set to a value near 16 atom %.

As described above, according to the magnetooptic disk of the embodiment, since the saturation magnetization of the second magnetic layer 5 is larger than $8.80 \times 10^{-2}$ Wb/m$^2$ and is less than $1.76 \times 10^{-1}$ Wb/m$^2$, in the magnetooptic disk in which while good signal characteristics are held, the recording mark length is decreased and the track pitch is narrowed, the information signal can be reproduced and the high recording density of the magnetooptic disk can be realized. Since the content ratio of Co in the third magnetic layer 6 is set to a value in a range of 15 to 17 atom %, a recording power margin which is large enough and a reproducing margin which is large enough can be assured. Thus, the information signal can be recorded and reproduced by using the recording and reproducing apparatus for the conventional magnetooptic disk or optical disk. Large allowable ranges of a variation in the reproducing power and a variation in the recording power of the laser beam can be assured. Therefore, the magnetooptic disk in which the information signal which has been recorded at a high density can be preferably reproduced and a capacity is increased more and high reliability is obtained over the whole surface of each of the outer rim and the inner rim can be obtained.

According to the manufacturing method of the magnetooptic disk according to the embodiment, since the gas pressure upon film creation of the second magnetic layer 5 is set to a value which is larger than 0.6 Pa and is equal to or less than 3 Pa, the saturation magnetization Ms$_2$ of the second magnetic layer 5 can be controlled. Therefore, the magnetooptic disk in which the saturation magnetization Ms$_2$ and the saturation magnetic field Hs which are suitable to efficiently transfer the information signal recorded in the first magnetic layer 4 into the third magnetic layer 6 are assured can be manufactured. Therefore, the magnetooptic disk in which magnetic resolution in the signal detection is improved and the Magnetically Induced Super Resolution operation (MSR operation) can be executed with high reliability can be manufactured.

Although the embodiment of the invention has specifically been described above, the invention is not limited to the foregoing embodiment but various modifications based on the technical idea of the invention are possible.

For example, the numerical values and materials mentioned in the foregoing embodiment are merely shown as examples and other numerical values and materials different from those mentioned above can be also used as necessary.

For example, in the embodiment, although the sputtering method has been used as a film forming method of each of the layers formed on the disk substrate 2, any thin film forming methods other than the sputtering method can be used. Specifically speaking, a vacuum evaporation deposition method, a molecular beam epitaxy (MBE) method, a chemical vapor deposition growing (CVD) method, a plasma CVD method, a high density plasma CVD (HDP-CVD) method, or the like can be used.

For example, in the foregoing embodiment, explanation has been made with respect to the example in which the invention is applied to the magnetooptic disk 1 constructed in a manner such that the information signal is recorded and/or reproduced by irradiating a laser beam L1 to the magnetooptic disk 1 from the side of the disk substrate 2. However, the invention can be also applied to the magnetooptic disk constructed in a manner such that the information signal is recorded and/or reproduced by irradiating the laser beam L1 to the magnetooptic disk 1 from the side opposite to the existing side of the disk substrate 2. In this instance, the multilayer magnetic film 10 is constructed by sequentially laminating the third magnetic layer, second magnetic layer, and first magnetic layer from the side near the disk substrate 2, that is, what is called in descending order. At this time, in place of the disk substrate 2, a light transmitting sheet, a light curing type resin, or the like having a thickness of about 70 to 170 μm is used as a light transmitting layer.

For example, although the multilayer magnetic film 10 is constructed by three layers of the first magnetic layer 4 as a recording layer, the second magnetic layer 5 as an intermediate layer or a cutting layer, and the third magnetic layer as a reproducing layer in the embodiment, the multilayer magnetic film 10 can be also constructed by four or more layers.

For example, although the GdFeCoSi film has been used as a second magnetic layer 5 in the embodiment, other compositions can be also used. Specifically speaking, the second magnetic layer 5 can be also constructed by materials such as GdFe, GdFeCo, GdFeSi, or the like.

As described above, according to the invention, the power margin of the laser beam in a large range where the signal can be recorded and/or reproduced can be assured. Thus, the information signal recorded on the magnetooptic recording medium in which the recording mark length is decreased and the track pitch is narrowed can be reproduced while keeping the good signal characteristics. Therefore, the magnetooptic recording medium in which the high recording density can be realized, the large capacity is accomplished, and the high reliability is provided can be obtained.

The invention claimed is:

1. A magnetooptic recording medium constructed so that an information signal can be recorded and/or reproduced to/from a land and a groove by irradiating a laser beam onto a multilayer magnetic film, in which
    a light transmitting substrate having a plurality of lands and a plurality of grooves which are alternately formed and
    a multilayer magnetic film in which
    a first magnetic layer made of GdFeCo having perpendicular magnetic anisotropy at room temperature,
    a second magnetic layer made of GdFeCoSi having inplane magnetic anisotropy at room temperature, and
    a third magnetic layer made of TbFeCo having perpendicular magnetic anisotropy at room temperature
    are sequentially laminated is provided on a substrate and
    a content ratio of Co in the third magnetic layer is equal to or larger than 15 atom % and is equal to or less than 17 atom %.

2. A magnetooptic recording medium according to claim 1, wherein a Curie temperature in said second magnetic layer is lower than both of a Curie temperature of said first magnetic layer and a Curie temperature of said third magnetic layer.

3. A magnetooptic recording medium according to claim 1, wherein a film thickness of said second magnetic layer is equal to or larger than 25 nm and is equal to or less than 60 nm.

4. A magnetooptic recording medium according to claim 1, wherein saturation magnetization of said first magnetic layer is equal to or less than $8.80 \times 10^{-2}$ Wb/m$^2$.

5. A magnetooptic recording medium according to claim 4, wherein the saturation magnetization of said first magnetic layer is equal to or larger than $1.00 \times 10^{-2}$ Wb/m$^2$.

6. A magnetooptic recording medium according to claim 1, wherein said multilayer magnetic film is provided on one principal plane formed with a concave and convex groove track of said substrate.

7. A magnetooptic recording medium according to claim 6, wherein said substrate has a plane ring shape.

8. A magnetooptic recording medium according to claim 6, wherein when it is assumed that a numerical aperture of an optical system for recording/reproducing said information signal to/from said magnetooptic recording medium is set to NA and a wavelength of said laser beam is set to λ, a track pitch of the groove track on one principal plane of said substrate is equal to or larger than $0.47 \cdot \lambda/\text{NA}\mu\text{m}$ and is equal to or less than $0.83 \cdot \lambda/\text{NA}\mu\text{m}$.

9. A manufacturing method of a magnetooptic recording medium constructed in a manner such that by irradiating a laser beam onto said multilayer magnetic film, an information signal can be recorded and/or reproduced onto/from a land and a groove,
  wherein a light transmitting substrate having a plurality of lands and a plurality of grooves which are alternately formed and
  a multilayer magnetic film in which
    a first magnetic layer made of GdFeCo having perpendicular magnetic anisotropy at room temperature,
    a second magnetic layer made of GdFeCoSi having inplane magnetic anisotropy at room temperature, and
    a third magnetic layer made of TbFeCo having perpendicular magnetic anisotropy at room temperature
  are sequentially laminated is provided on a substrate and
  atmospheric pressure at the time of forming the second magnetic layer is larger than 0.6 Pa and is equal to or less than 3.0 Pa and
  a content ratio of Co in the third magnetic layer is set to be equal to or larger than 15 atom % and is equal to or less than 17 atom %.

10. A manufacturing method of a magnetooptic recording medium according to claim 9, wherein a Curie temperature in said second magnetic layer is lower than a lower one of a Curie temperature of said first magnetic layer and a Curie temperature of said third magnetic layer.

11. A manufacturing method of a magnetooptic recording medium according to claim 9, wherein said second magnetic layer is formed so that a film thickness is equal to or larger than 25 nm and is equal to or less than 60 nm.

12. A manufacturing method of a magnetooptic recording medium according to claim 9, wherein said first magnetic layer is formed as a film so that saturation magnetization of said first magnetic layer is equal to or less than $8.80 \times 10^{-2}$ Wb/m$^2$.

13. A manufacturing method of a magnetooptic recording medium according to claim 12, wherein said first magnetic layer is formed as a film so that the saturation magnetization of said first magnetic layer is equal to or larger than $1.00 \times 10^{-2}$ Wb/m$^2$.

14. A manufacturing method of a magnetooptic recording medium according to claim 9, wherein said second magnetic layer is formed as a film so that saturation magnetization of said second magnetic layer is larger than $8.80 \times 10^{-2}$ Wb/m$^2$ and is less than $1.76 \times 10^{-1}$ Wb/m$^2$.

15. A manufacturing method of a magnetooptic recording medium according to claim 9, wherein said multilayer magnetic film is provided on one principal plane formed with a concave and convex groove track of said substrate.

16. A manufacturing method of a magnetooptic recording medium according to claim 15, wherein said substrate has a plane ring shape.

17. A manufacturing method of a magnetooptic recording medium according to claim 15, wherein when it is assumed that a numerical aperture of an optical system for recording/reproducing said information signal to/from said magnetooptic recording medium is set to NA and a wavelength of said laser beam is set to λ, a track pitch of the groove track on one principal plane of said substrate is equal to or larger than $0.47 \cdot \lambda/\text{NA}\mu\text{m}$ and is equal to or less than $0.83 \cdot \lambda/\text{NA}\mu\text{m}$.

18. A magnetooptic recording medium according to claim 1, wherein the saturation magnetization of said second magnetic layer is larger than $8.80 \times 10^{-2}$ Wb/m$^2$ and is less than $1.76 \times 10^{-1}$ Wb/m$^2$.

* * * * *